Figure 1:
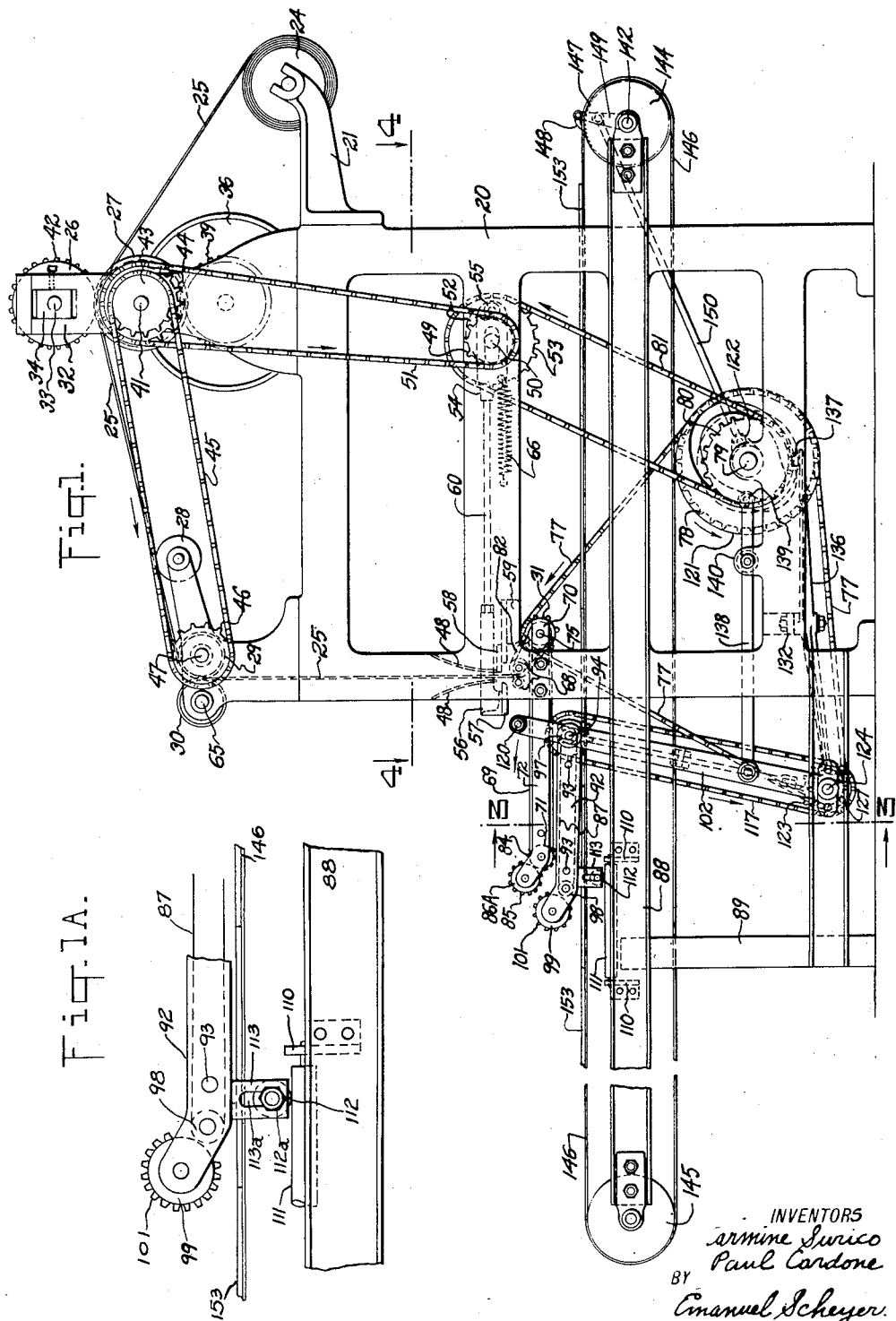

March 26, 1929.	C. SURICO ET AL	1,706,637
MACHINE FOR FOLDING NOODLES
Filed Jan. 29, 1926	7 Sheets-Sheet 1

INVENTORS
Carmine Surico
Paul Cardone
BY Emanuel Scheyer
ATTORNEY

March 26, 1929.  C. SURICO ET AL  1,706,637
MACHINE FOR FOLDING NOODLES
Filed Jan. 29, 1926    7 Sheets-Sheet 3

INVENTORS
Carmine Surico
Paul Cardone
BY Emanuel Scheyer
ATTORNEY

March 26, 1929.  C. SURICO ET AL  1,706,637
MACHINE FOR FOLDING NOODLES
Filed Jan. 29, 1926  7 Sheets-Sheet 4

Fig. 4.

INVENTORS
Carmine Surico
Paul Cardone
BY
Emanuel Scheyer
ATTORNEY

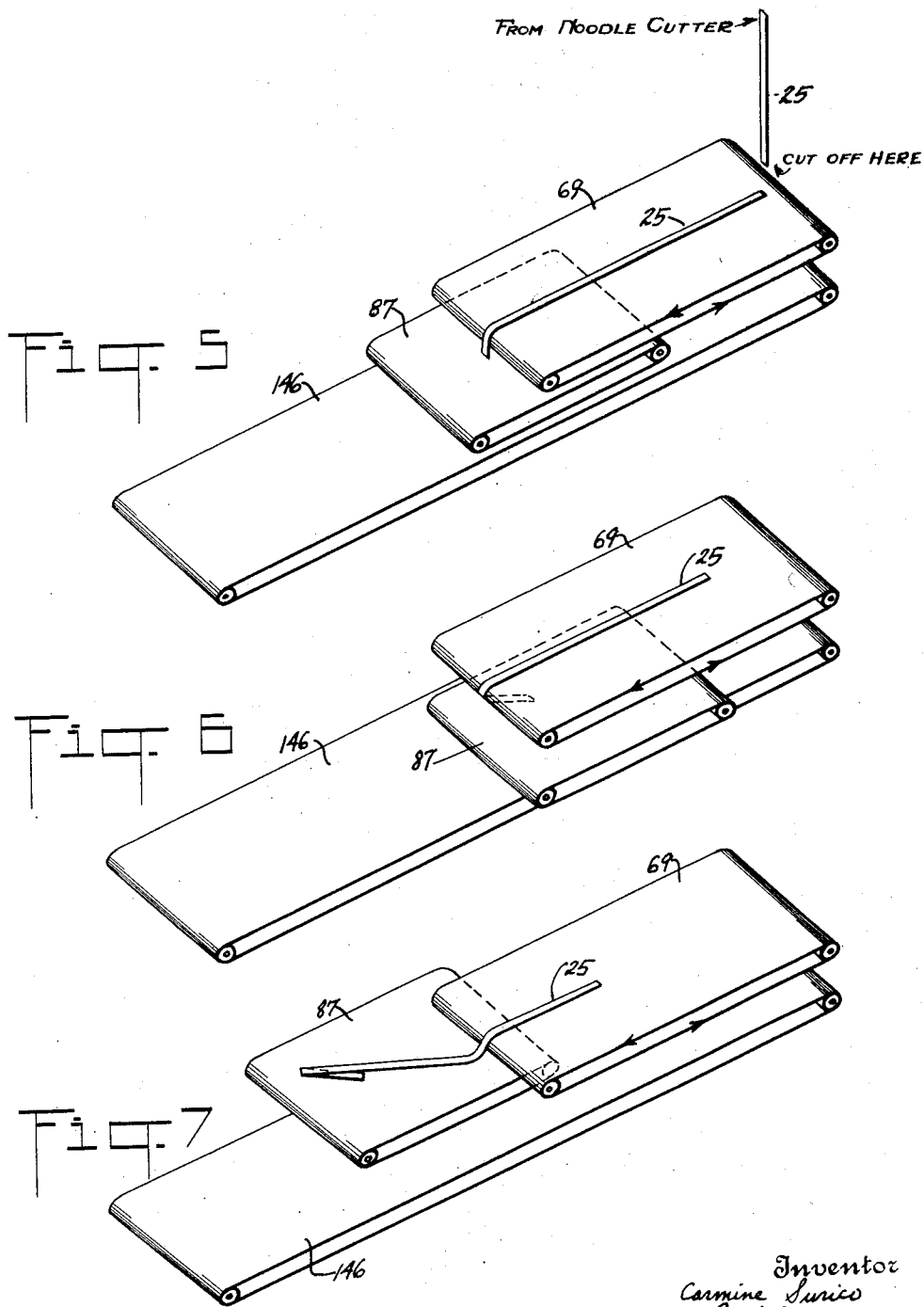

March 26, 1929.  C. SURICO ET AL  1,706,637
MACHINE FOR FOLDING NOODLES
Filed Jan. 29, 1926  7 Sheets-Sheet 6
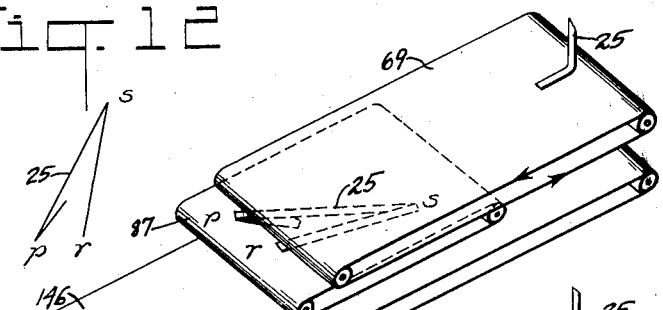
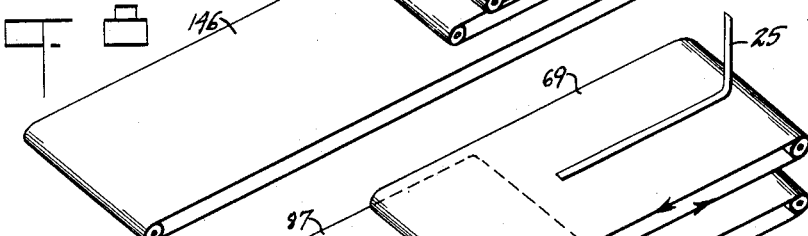
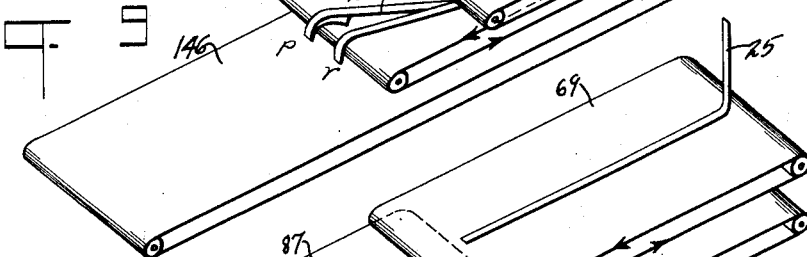
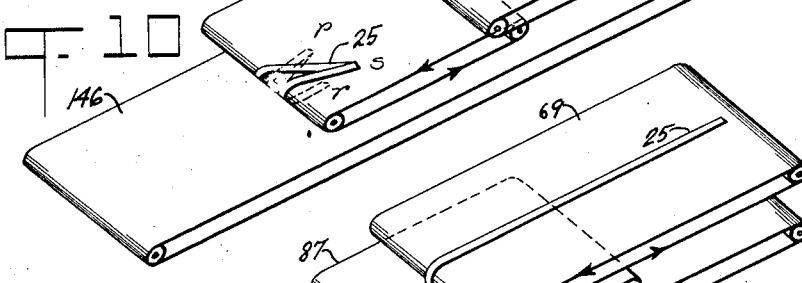
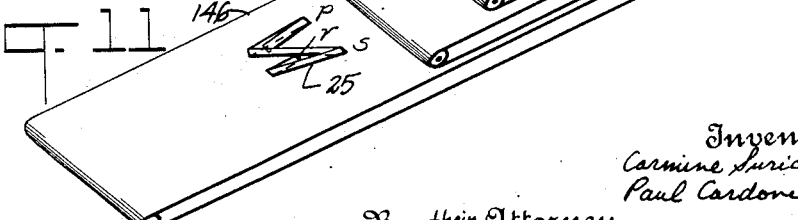
Inventor
Carmine Surico
Paul Cardone
By their Attorney
Emanuel Scheyer March 26, 1929.     C. SURICO ET AL     1,706,637
MACHINE FOR FOLDING NOODLES
Filed Jan. 29, 1926     7 Sheets-Sheet 7
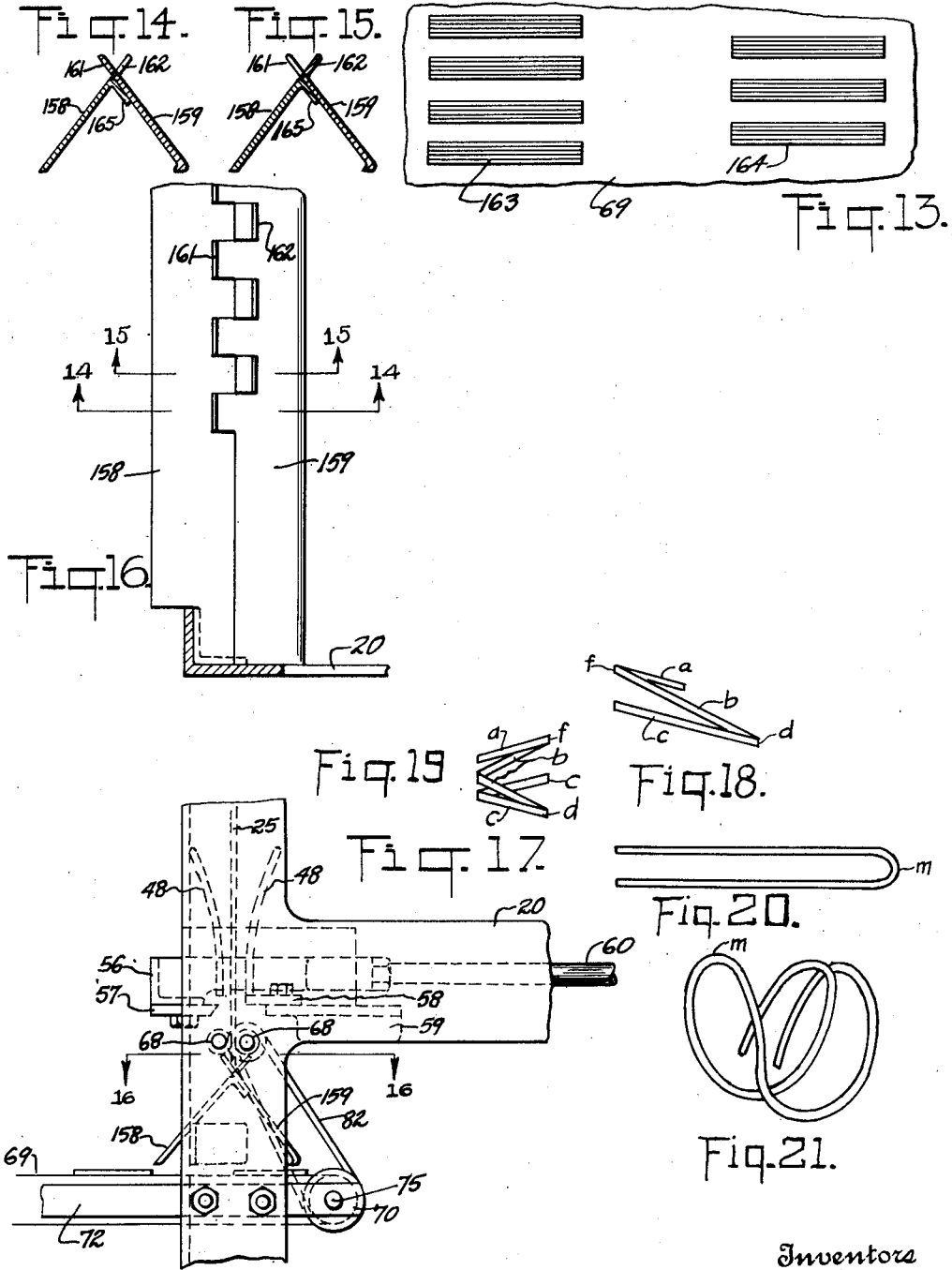

Patented Mar. 26, 1929.

1,706,637

UNITED STATES PATENT OFFICE.

CARMINE SURICO AND PAUL CARDONE, OF NEW YORK, N. Y., ASSIGNORS TO CLERMONT MACHINE CO., INC., OF NEW YORK, N. Y.

MACHINE FOR FOLDING NOODLES.

Application filed January 29, 1926. Serial No. 84,687.

Our invention relates to improvements in machinery for working noodles and analogous dough products into a continuous body or separate bunches of various forms. A sheet of dough is cut into strips (noodles) and then folded or twisted, or a plurality of strings of macaroni in a row can be fed into the machine between suitable guides provided and then folded or twisted. The slit sheet of dough or the row of macaroni is fed downward upon a continuously moving endless belt or other conveying means and when a predetermined amount of the sheet is laid out upon the belt, the sheet is cut transversely. The cut sheet continues to travel with the belt, its forward end running down off the front end of the belt onto another endless belt, or receiving surface, just below, which latter belt we shall call the middle belt. The middle belt, in one form is adapted to run upon rollers which are supported in a frame which can be moved backward and forward and reciprocated transversely. Mechanism is provided whereby the middle belt is adapted to run only for predetermined intervals. In the preferred form, when the forward end of the cut sheet begins to deposit on the middle belt, said belt is not running, but moves as a whole or bodily with its rollers in a forward direction and transversely at the same rate as the cut sheet is being deposited upon it. Other motions can be given to the middle belt during the time of its reception of the noodles from the delivery means, depending upon the form it is decided to give the folded noodles. Also the middle belt can be given a running motion during the time of reception for effecting certain forms. These motions of the middle belt result in the noodle being deposited thereon in folded form. Means are further provided for again folding the noodles which have been deposited on the middle belt in folded form. In the preferred form, the second folding is effected by running the middle belt so that the folded noodles pass off its forward end onto a second receiving surface or tray provided below the middle belt. During the time of reception of the noodles upon the tray, the middle belt is adapted to be given a variety of motions depending upon the final form desired. A number of trays are provided, preferably mounted upon a conveyor which can be maintained stationary or given running motion during the time the noodles are received also depending on the folded form desired.

Further instead of causing the middle belt to have the various bodily motions, as a mechanical equivalent the means for delivering the noodles to it can be given those motions while the middle belt remains stationary resulting also in the folding of the noodles. In a similar manner the trays upon the lower belt can be given various motions while the middle belt is stationary for effecting the second folding of the noodles. Broadly speaking, it is the relative motion between the middle belt and the other devices which accomplishes the folding of the noodles.

Other objects and advantages will become apparent upon further study of the specification and drawings, in which:—

Figure 2:
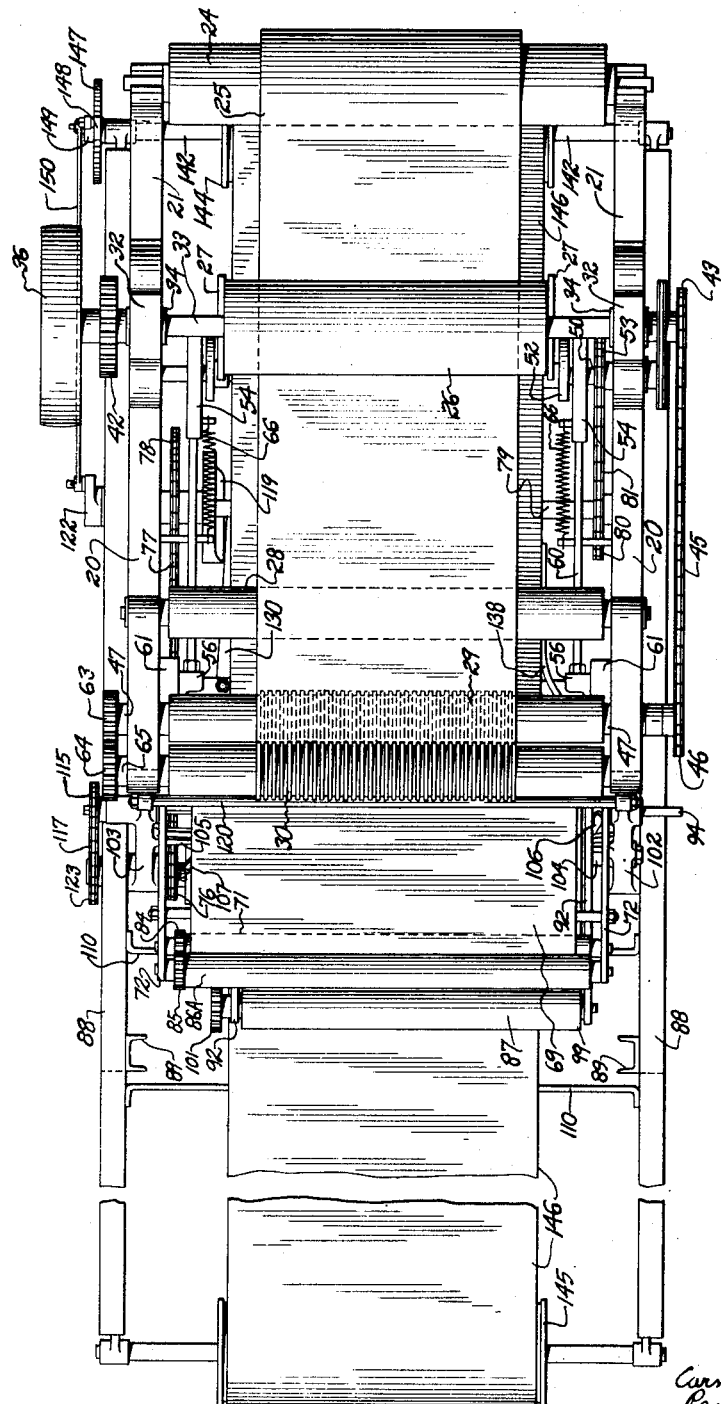
Figure 3:
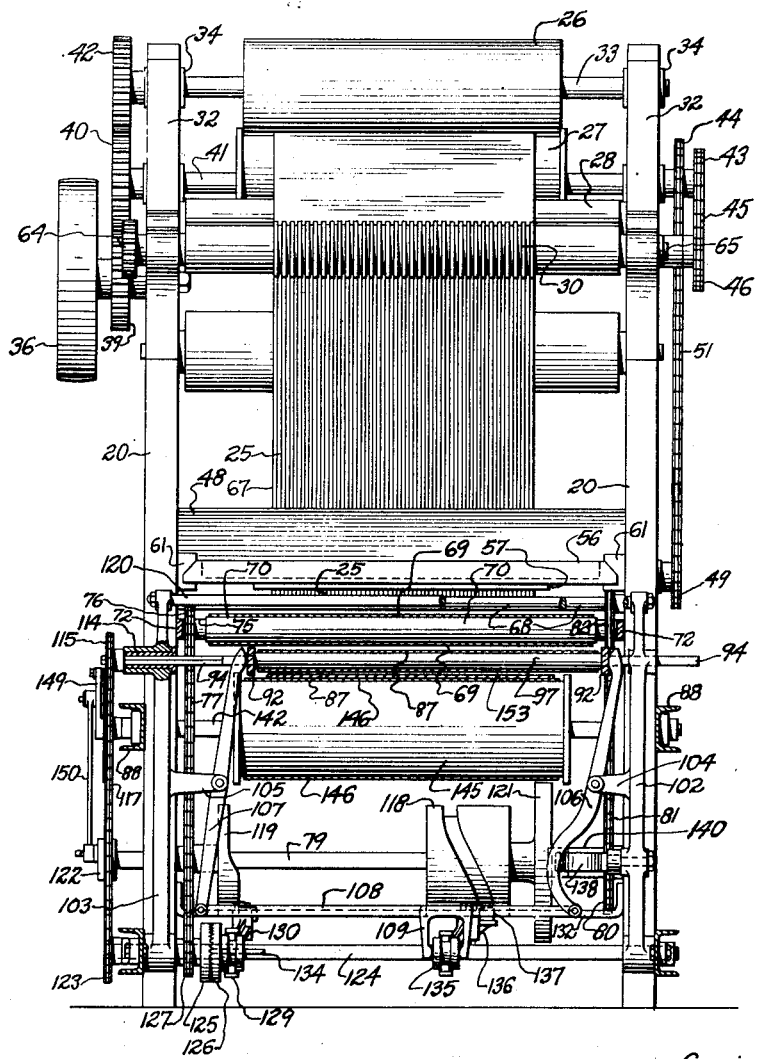

Figure 1 is a side elevation of the machine, Figure 1<sup>A</sup> is a detail view showing the mechanism for adjusting the height of the middle belt, Figure 2 is a plan with the receiving trays omitted, Figure 3 is a partial section and front elevation along the line 3—3 of Figure 1, Figure 4 is a sectional plan along the line 4—4 of Figure 1, Figure 5 is a diagrammatic view showing the three folding belts in their relative positions at the beginning of the folding operation, Figure 6 shows the middle belt as having moved transversely and backward receiving the first leg of the fold, Figure 7 shows middle belt moved in the opposite direction transversely and forward for the reception of the second leg, Figure 8 shows the noodle in the first folded stage upon the middle belt, Figure 9 shows the folded noodle about to deposit on the lower belt for the second folding, Figure 10 shows the middle belt moved forward with half the noodle deposited on the lower belt, Figure 11 shows middle belt moved backward and transversely with the fully folded noodle on the lower belt, Figure 12 is a diagram of the relative motion between the middle belt and the delivery means for the first folding operation, Figure 13 is a fragmental plan of the upper belt showing the noodle sheet distributed in bunches thereon after passing the deflector plate, Figure 14 is a section along the line 14—14 of Figure 16 and shows a section of a deflector plate used in a modified form of the apparatus for dividing the noodle sheet into individual bunches, Figure 15 is another section of the deflector plate taken along the line 15—15 of Figure 16, Figure 16 is a partial plan of the deflector plate, Figure 17 is a partial elevation of the modified apparatus showing the relation of the deflector plate to the cutting off knives and upper belt, Figure 18 shows the first folding stage of a modified form of folded noodle, Figure 19 shows the final folded stage of said form, Figure 20 shows the first folding stage of another form and Figure 21 its final stage.

The mechanism, which is supported in two main frames 20 suitably braced to each other, consists of apparatus for feeding in a sheet of dough, means for shredding the sheet, means for cutting off the sheet into predetermined lengths, an upper endless belt 69 for receiving the cut sheet, a middle endless belt 87 below this upper belt and a large endless belt 146, below the middle belt 87, for conveying trays 153, which receive the finished product, past middle belt 87. In addition, apparatus is provided for timing and operating these various devices.

The apparatus for supplying and feeding in the dough sheet to the machine consists of a roller 24 which has the dough sheet 25 wound upon it. Roller 24 is rotatably supported in brackets 21 mounted upon frames 20. Dough sheet 25 is led from roller 24 between feeding and calibrating rollers 26 and 27 (Figures 1, 2 and 3), over guide roller 28 and thence between corrugated slitting rollers 29 and 30 from which it hangs vertically as shown in Figure 3 in strips, shreds or noodles, the lower end entering between the converging guide plates 48 supported between frames 20 (Figures 1 and 17). The function of calibrating rollers 26 and 27, besides that of pulling off the dough sheet 25 from roller 24, is to reduce the thickness of the dough sheet as desired. For this, roller 26 is mounted in end blocks 34 which are adjustably mounted in brackets 32 supported on frames 20 whereby the distance between rollers 26 and 27 can be varied.

The power for the machine is obtained from a pulley 36 which is adapted to be power driven. Mounted in fixed relationship to pulley 36, is gear 39 which meshes with gear 40 above it (Figure 3). Gear 40 is fixed to shaft 41 upon which is mounted lower calibrating roller 27. Gear 42 fixed to shaft 33, meshes with gear 40. Upper calibrating roller 26 is fixed upon shaft 33. Slitting rollers 29 and 30 are driven by chain 45 which meshes with sprocket wheel 43 fixed to shaft 41. The other end of chain 45 engages sprocket wheel 46 fixed to shaft 47 which carries slitting roller 29. To the other end of shaft 47 is fixed gear 63 which meshes with gear 64 fixed to shaft 65 carrying slitting roller 30.

As the slit dough sheet 25 passes from the bottom of guides 28, it passes between knives 57 and 58 (Figures 1 and 4) which are adapted at predetermined intervals to cut the dough sheet. Knife 58, which is fixed, is bolted to bracket 59 fastened between frames 20. Movable knife 57 is bolted to slidable carriage 56 which slides in gibs 61 (Figure 3) supported on frames 20. Carriage 56 is operated from cam shaft 50 (Figures 1 and 4). Sprocket wheel 49, fixed to cam shaft 50, is driven by chain 51. The upper end of chain 51 meshes with sprocket wheel 44 fixed to shaft 41. Cam shaft 50 carries wiper cams 52 fixed to it near its ends. Engaging cams 52 are rollers 55 mounted on yokes 54 (Figure 1) which are slidably mounted on shaft 50. Cam rods 60 attached to yokes 54 are fastened at their other end to carriage 56. The return stroke of carriage 56 is effected by springs 66.

Passing between knives 57 and 58, dough sheet 25 travels on downward between rollers 68, the right hand one (Figure 7) being driven by belt 82 from pulley 31 fixed to shaft 75 as will be explained hereinafter. After passing between rollers 68, dough sheet 25 comes down on continuously running endless belt 69, which will be known as the upper belt. Upper belt 69 will be run at about twice the speed that the dough sheet 25 is fed to it from above, resulting in stretching and combing out the individual noodles comprising said sheet (Figures 5, 8, 9, 10 and 11). This further results in delivering cut lengths of dough sheet off the front end of upper belt 69 at intervals. Upper belt 69 runs on rollers 70 and 71 supported between flats 72. Roller 70 is fixedly mounted on shaft 75. Sprocket wheel 76 which is fixedly mounted to the left end of shaft 75 (Figure 3) is driven by chain 77 (Figure 1). Chain 77 also meshes with sprocket wheel 78 fixed to cam shaft 79 and sprocket wheel 127 fixed to shaft 124 whose function will be explained later. To the opposite end of shaft 79 from that upon which sprocket wheel 78 is fixed, is fixed sprocket wheel 80 meshing with chain 81. The upper end of chain 81 meshes with sprocket wheel 53 fixed to the knife cam shaft 50. Shaft 50 is driven through the chain of connections already described from pulley 36.

Roller 71 carries gear 84 fixed near one end of it (Figures 2 and 4). Gear 84 meshes with gear 85 fixed to roller 86^A. The dough sheet 25 is fed forward on the top of upper belt 69 and passes off the front end between rollers 71 and 86^A passing down upon the top of middle belt 87. Middle belt 87 is adapted to be given a variety of motions. It is adapted to be run as an ordinary endless belt about rollers 97 and 98 (Figures 1 and 4) and in addition thereto it can be moved bodily with said rollers in a longitudinal direction backward and forward to the right and to the left (Figure 1) and in a transverse direction to the right and to the left (Figure 3). Roller 97 is fixed upon shaft 94 and supported in arms 102 and 103 rotatably mounted on shaft 124. Shaft 94 is rotatably and slidably mounted at one end in arm 102, while the other end of said shaft carries a bushing 114 (Figure 3) which is rotatably mounted in arm 103. Shaft 94 is squared for a distance, bushing 114 having a corresponding bore so that said shaft can slide transversely in said bushing but is compelled to rotate with it. Sprocket wheel 115 is fixedly mounted upon bushing 114. Chain 117 meshes with sprocket wheel 115 and with sprocket wheel 123 fixed to shaft 124. Sprocket wheel 127 (Figures 1 and 3) is rigidly connected to clutch member 125 and both are loosely mounted on shaft 124. Sprocket wheel 127, as was previously explained, is continuously power driven by chain 77. Clutch member 126 is splined to shaft 124 sliding laterally in keyway 134 turning said shaft whenever it engages member 125. Member 126 has a grooved hub forming a housing for yoke 129 (Figures 3 and 4). Yoke 129 is formed on the end of lever 130 fulcrumed on a fixed cross bar 132. The other end of lever 130 has mounted upon it cam roller 131 adapted to ride against the face of cam 119 fixed to cam shaft 79. Cam 119 is so formed that lever 130 is shifted at predetermined intervals, throwing clutch member 126 into engagement with its mate 125 and thereby running middle belt 87 about its rollers. Roller 98 of middle belt 87 is supported in arms 92 braced to each other by tie rods 93 (Figures 1 and 4). Arms 92 are loosely mounted on shaft 94 with roller 97 between them. The forward end of each arm 92 carries projecting below it a bracket 113 in which is mounted guide roller 112. Two channels 88 are provided running longitudinally of the machine and fastened to frames 20 and forward posts 89. Cross bars 110 span between frames 20 just below guide roller 112. Rotatably mounted between cross bars 110 are guide rollers 111 upon which guide roller 112 rests. This arrangement of guide rollers permits of an easy longitudinal bodily motion of middle belt 87, guide roller 112 rolling upon guide rollers 111. In transverse bodily motion of said belt, guide rollers 111 rotate as guide roller 112 passes over them.

In order to permit adjustment of the height of the forward end of middle belt 87, brackets 113 are provided with slots 113ª (Figure 1ᴬ). Studs 112ª, which rotatably support the ends of roller 112, can be set at various positions in said slots. The advantage of being able to raise middle belt 87 is that its height can be made to suit the receiving trays 153 which receive the noodles.

Longitudinal bodily reciprocating motion of middle belt 87 is effected by the rocking of arms 102 and 103 on shaft 124, said arms being loosely mounted on said shaft. Tie rod 120 rigidly ties arms 102 and 103 together at their tops. Cam rod 138 is pivotally fastened to arm 102, the other end of cam rod 138 carries a roller 139 which operates in the groove of cam 121 fixed to constantly rotating cam shaft 79. Cam rod 138 is supported at an intermediate point by passing through sleeve 31 (Figure 4) which is pivotally mounted on lug 140 formed on frame 20. The rotation of cam 121 reciprocates cam rod 138, rocking arms 102 and 103, thereby effecting the longitudinal bodily motion of middle belt 87.

Transverse bodily reciprocating motion of middle belt 87 is effected by the rocking of arms 106 and 107 (Figure 3) pivotally mounted respectively in brackets 104 and 105 projecting respectively from arms 102 and 103. The lower ends of arms 106 and 107 are pivotally connected by a rod 108 from which fork 109 projects downward. The upper ends of arms 106 and 107 are rounded and abut against the sides of arms 92 which support rollers 97 and 98 of middle belt 87. Loosely and slidably mounted on shaft 124 between the prongs of fork 109 is a grooved sleeve 135 (Figures 3 and 4). One end of cam rod 136 is suitably formed to engage with the groove of sleeve 135, the other end of said rod carries a roller 137 for engagement with the groove of cam 118 fixed to cam shaft 79. Cam rod 136 is pivotally mounted at an intermediate point on cross piece 132 spanning between frames 20. The rocking of cam rod 136 by cam 118 effects the reciprocation of rod 108 and thereby accomplishes the transverse bodily motion of middle belt 87.

Roller 98 has gear 100 (Figure 4) fixed to one end of it. Gear 100 meshes with gear 101 fixed to roller 99 carried between the left ends of arms 92. At predetermined intervals, the dough sheet 25 when folded into the form shown in Figures 8 and 9 is fed forward by the running of belt 87, between rollers 98 and 99 from which it passes down to trays 153 carried by intermittently moving belt 146. As the slit dough sheet 25 begins to come down upon middle belt 87 from upper roller 69 (Figure 5), middle belt 87 is given no running motion, but is caused to be moved simultaneously bodily backward longitudinally and transversely to the right (Figure 6) until a portion of the cut lengths of dough strips as shown have been deposited upon the middle belt. The formation and phase of cam 121 is such that at this time the longitudinal motion of the middle belt is reversed while cam 118 causes transverse motion in the opposite direction from before (Figure 7), and the dough strips continue to come down from the upper belt. Cam 118 then actuates rod 136 to move middle belt transversely to the right (Figure 8) and backward longitudinally. The first folding operation is now complete with the noodle as shown in Figure 8 lying on middle belt 87. Cam 119 now actuates rod 130 (Figures 3 and 4) to throw in clutch 126, running middle belt 87 about its rollers. It is to be observed that the dough strips are deposited on the middle belt with crease $p$ and end $r$ pointing forward, so that as the upper run of the middle belt runs forward, they come between rollers 98 and 99 and feed downward upon a tray 153 upon lower belt 146 which remains stationary at this time. In Figures 10 and 11 the noodle is shown diagrammatically as coming directly upon lower belt 146. As the dough strips come down on tray 153 upon lower belt 146 with the running of middle belt 87, cam 121 rocks arms 102 and 103 forward moving said middle belt bodily forward with the same rate of speed as the rate of deposit until half the length of the folded noodle has been deposited upon the tray with crease $p$ and end $r$ pointing backward, at which time cam 121 reverses the bodily longitudinal motion of said middle belt causing it to move backward, and cam 118 simultaneously causes it to move transversely to the right, thereby depositing the noodle with the crease $s$ in the position shown in Figure 11. A new length of slit sheet 25 by this time has been deposited on upper belt 69 and the series of steps just recited is ready to be repeated again with said new length.

After the completely folded sheet of noodles has been deposited on a tray 153, lower belt 146 is moved a step forward carrying a new tray 153 into position under the forward end of middle belt 87. The intermittent movement of belt 146 is effected from shaft 79. One end of shaft 79 carries a crank 122 (Figures 1, 3 and 4) to which is pin connected rod 150. The upper end of rod 150 is pin connected to a crank 149 loose on shaft 142. Fixed to shaft 142 adjacent to crank 149 is a ratchet wheel 147. The upper end of crank 149 carries a pawl 148 adapted to engage the teeth of ratchet wheel 147. As rod 150 is reciprocated, shaft 149 is given a step by step rotation, causing roller 144 which is carried by said shaft to feed belt 146 with an intermittent motion. The forward end of belt 146 passes over an idler roller 145.

Many variations in the shape of the folded noodles can be obtained by varying the form of cams 118 and 121 controlling the transverse and longitudinal movements respectively of middle belt 87. A triple folded noodle can be obtained if cam 121 is so formed that middle belt 87 is given two complete longitudinal reciprocations during the time the noodle is being deposited on a tray 153.

An alternate method which effects the depositing of the noodles in separate folded bunches is illustrated in Figures 13 to 17 inclusive. Instead of the shredded sheet 25 passing down directly upon upper belt 69 after it leaves the rollers 68, deflecting plates 158 and 159 are provided upon which the strips descend. Plate 158 is provided with a turned down flange 165, against which plate 159 is fastened. The upper end of plate 159 is slit, with alternate portions 162 bent back, portions 161 remaining unbent (Figures 14 and 15). The sheet of noodles 25 in descending has those noodles contacting with portions 162 deflected to the left (Figure 17) forming bunches 163 and those contacting with portions 161 deflected to the right forming bunches 164, both sets of bunches resting upon upper belt 69. Deflector plates 158 and 159 are so proportioned as to provide a space between bunches 163 and 164 as they lie upon upper belt 69, that bunch 164 will reach the initial position for the folding operation when bunch 163 has been completely operated upon. The folding operations are the same as those described above in connection with the first described construction.

Figures 18 and 19 illustrate another form in which the noodles can be folded, either in a continuous sheet or in separate bunches, one noodle being shown by way of illustration. Cam 118 is so formed for this modification, as will be explained, that there are three stages to the transverse motion of the middle belt 87 while receiving the noodles from the upper belt 69. Cam 121 will also cause three corresponding longitudinal motions during this time.

Referring now to Figures 1, 3 and 18, middle belt 87 starts the cycle of operations from its central position longitudinally and somewhat to the left transversely. In this position of middle belt 87, the noodle from upper belt 69 is just beginning to come down upon it. As the noodle continues to come down middle belt 87 is moved to the right (Figure 3) transversely and backward (right Figure 1) longitudinally to its extreme position there being a relatively small transverse motion. These motions deposits leg $a$ of the noodle on the middle belt. The middle belt then moves forward to its extreme forward position and at the same time moves transversely to the left, depositing leg $b$ the transverse motion in this case being relatively greater. Middle belt then moves backward longitudinally to its extreme position and at the same time transversely to the right at about the same relative rate as its first transverse motion, resulting in the deposit of leg $c$. During these motions there is no feeding or running motion of the middle belt.

The motions will now be described for obtaining the form shown in Figure 19 from that shown in Figure 18. Middle belt 87 is now caused to have running motion by cam 119 and at the same time is moved bodily longitudinally forward so that it reaches its central longitudinal position at about the time the forward end of leg $c$ (Figure 18) and the crease $f$ are beginning to deposit on a tray 153. The middle belt continues to move to its extreme forward position and then returns to its central position, resulting in depositing the noodle with its creases $d$ and $f$ to the back as in Figure 19. No transverse motion is given to the middle belt while it is depositing its noodle on a tray 153.

Figures 20 and 21 illustrate another form in which the noodles can be folded in separate bunches. Cams 118, 119 and 121 are so formed that the following motions take place:—Middle belt 87 starts (Figures 1, 3 and 20) all the way back longitudinally and to the right transversely. As the noodle bunches, separated by the mechanism of Figures 14, 15, 16 and 17, descend upon the middle belt, it moves longitudinally bodily forward to its extreme position without any transverse motion. When it reaches its forward position, a slight transverse bodily motion to the left takes place after which it moves longitudinally bodily back to its rear position resulting in the deposit of the noodles each in a U form with the nose of the U to the rear. Before depositing this U form on trays 153 on lower belt 146, middle belt 87 is moved forward halfway and at the same time transversely to its right position. During this motion, the running or feeding motion of the middle belt takes place so that the noodles are just beginning to deposit on trays 153 when the middle belt has reached its last mentioned position. Middle belt still continuing to feed, then moves back and transversely to the left and then moves transversely to the right with a slight backward motion. Finally it moves forward and transversely to the left in such proportion that the resultant motion of middle belt 87 is circular. This results in the deposit of each noodle in the form shown in Figure 21.

In the claims the term "noodle" is used, but it is to be understood that this term is to include analogous dough products such as fidellini, vermicelli, etc.

We claim:—

1. In a machine for folding noodles, a receiving surface, means for delivering one end first cut-off substantially straight lengths of noodles, at intervals, to the receiving surface, mechanism for effecting, during the intervals of reception, relatively between said delivery means and the receiving surface, bodily longitudinal motion and bodily transverse motion in predetermined relation to each other, whereby the lengths of noodles are folded upon the receiving surface in predetermined form.

2. In a machine for folding noodles, a receiving surface, means for delivering cut-off lengths of noodles, at intervals, to the receiving surface, mechanism for effecting, during the intervals of reception, relatively between said delivery means and the receiving surface, bodily longitudinal motion and bodily transverse motion in predetermined relation to each other, whereby the lengths of noodles are folded upon the receiving surface in predetermined form, and means for again folding the folded noodles.

3. In a machine for folding noodles, a receiving conveyor belt, means for delivering cut-off lengths of noodles, at intervals, to the conveyor belt, mechanism for effecting, during the intervals of reception, relatively between said delivery means and the conveyor belt, bodily longitudinal motion and bodily transverse motion in predetermined relation to each other, whereby the lengths of noodles are folded upon the receiving belt in predetermined form.

4. In a machine for folding noodles, a receiving conveyor belt, means for delivering cut-off lengths of noodles, at intervals to the conveyor belt, mechanism for effecting, during the intervals of reception, relatively between said delivery means and the conveyor belt, bodily longitudinal motion and bodily transverse motion in predetermined relation to each other, whereby the lengths of noodles are folded upon the receiving belt in predetermined form, and means for again folding the folded noodles.

5. In a machine for folding noodles, a receiving conveyor belt, means for delivering noodles to the conveyor belt, means for causing relative bodily forward and backward and transverse motion between said delivering means and the conveyor belt, whereby the noodles are deposited on the belt in predetermined folded shapes, means for intermittently imparting a feeding motion to said belt, a receiving surface disposed below said belt and adapted to receive noodles fed by the belt, and means for causing relative bodily forward and backward motion between the belt and the receiving surface.

6. A machine, according to claim 5, in which the final receiving surface is in the form of an endless conveyor belt.

7. In a machine for folding noodles, a receiving surface, means for delivering noodles to the receiving surface, means for causing relative bodily longitudinal motion and bodily transverse motion between said delivering means and the receiving surface during the delivery of the noodles whereby the noodles are deposited in predetermined manner upon the receiving surface, another receiving surface disposed below said first receiving surface, means for feeding the noodles from the first receiving surface upon the lower receiving surface and means for causing relative bodily longitudinal motion and bodily transverse motion between said receiving surface during said feeding for depositing the noodles in predetermined folded form upon the lower surface.

8. In a machine for folding noodles, a receiving conveyor belt, means for delivering noodles to the conveyor belt, means for causing relative bodily longitudinal motion and bodily transverse motion between said delivering means and the conveyor belt during the delivery of the noodles, whereby the noodles are deposited in predetermined manner upon the belt, a receiving surface disposed below said belt and adapted to receive the noodles fed by the belt and means for causing relative bodily backward and forward motion and bodily transverse motion between the belt and the receiving surface, during the reception of the noodles by said surface, for depositing the noodles in predetermined folded form upon said receiving surface.

9. In a machine of the character described, mechanism for lowering a sheet of noodles and cutting them off in predetermined lengths, conveying means adapted to receive said noodles upon it as they descend, said mechanism being so disposed with respect to said means that one end of said noodles descends upon the top of said means, mechanism for causing said means to have bodily longitudinal motion and bodily transverse motion, in predetermined relation to each other, during the further descent of said noodles, whereby the lengths of noodles are folded on top of said means in predetermined form.

10. In a machine of the character described, mechanism for delivering cut-off lengths of noodles at intervals, a conveyor for receiving said lengths, mechanism for effecting during the intervals of said reception bodily longitudinal motion and bodily transverse motion of the conveyor in predetermined relation to each other, whereby the lengths of noodles are folded upon it in predetermined form, and means for effecting the feeding motion of the conveyor, during the time between the intervals of reception of said lengths, for discharging the folded lengths from the conveyor.

11. In a machine of the character described, mechanism for delivering cut-off lengths of noodles at intervals, an endless belt so disposed with respect to said mechanism that the advance end of said lengths descends upon the upper run of said belt, and means for effecting bodily longitudinal motion and bodily transverse motion of said belt in predetermined relation to each other and to the rate of delivery of said lengths, whereby said lengths are folded in predetermined form and in their entirety upon the upper run of said belt.

12. In a machine of the character described, mechanism for delivering cut-off lengths of noodles at intervals, a conveying belt so disposed with respect to said mechanism that said lengths descend upon said belt, said belt being given bodily motion during the time the noodles are descending upon it, a lower conveying belt adapted to receive the noodles as they are fed from said former belt, said former belt being given bodily motion as it feeds the noodles upon said lower belt, and mechanism adapted to operate both of said belts in their timed relations.

13. A machine as claimed in claim 12, in which the former belt has longitudinal bodily motion as it feeds the noodles upon said lower belt.

14. A machine as claimed in claim 12, in which the former belt has transverse bodily motion as said noodles descend upon it.

15. A machine as claimed in claim 12, in which the former belt has longitudinal bodily motion as said noodles descend upon it.

16. A machine as claimed in claim 12, in which the former belt is without feeding motion during the interval a length of noodles descends upon it.

17. A machine as claimed in claim 12, in which the former belt has reciprocating longitudinal bodily motion as it feeds the noodles upon said lower belt.

18. A machine as claimed in claim 12, in which the former belt has reciprocating longitudinal bodily motion as said noodles descend upon it.

19. A machine as claimed in claim 12, in which the former belt has reciprocating transverse bodily motion as said noodles descend upon it.

20. A machine as claimed in claim 12, in which the lower belt is without feeding motion during the interval a length of noodles is fed upon it.

21. In a machine of the character described, conveying means adapted by its running motion to carry forward upon it a plurality of noodles, another conveying means adapted to receive the noodles fed off said first conveying means, mechanism for causing said second conveying means to be given bodily longitudial motion and bodily transverse motion during its reception of the noodles, the motions of said conveying means bearing a predetermined relation to each other, whereby said noodles are deposited in folded form upon said second conveying means.

22. In a machine of the character described, a continuously running upper belt adapted to receive a plurality of noodles descending upon it and carry them forward to discharge over one end, another belt situated below said upper belt for receiving the noodles discharged from said upper belt, mechanism for causing said second belt to be given bodily longitudinal motion and bodily transverse motion during its reception of the noodles, the motions of said belts bearing a predetermined relation to each other whereby said noodles are deposited in folded form upon said second belt.

23. In a machine of the character described, conveying means adapted by its running motion to carry forward upon it a plurality of noodles, another conveying means adapted to receive the noodles fed off said first conveying means, said second conveying means adapted to be given bodily longitudinal motion and bodily transverse motion in addition to a feeding motion, mechanism for effecting the motions of said conveying means with a predetermined relation to each other, whereby said noodles are deposited in folded form upon said second conveying means and discharged therefrom at a predetermined rate.

24. In a machine of the character described, conveying means adapted by its running motion to carry forward upon it a plurality of noodles, another conveying means adapted to receive the noodles fed off said first conveying means, said second conveying means adapted to be given bodily longitudinal motion and bodily transverse motion in addition to an intermittent feeding motion, mechanism for effecting the motions of said conveying means with a predetermined relation to each other, whereby said noodles are deposited in folded form upon said second conveying means and discharged therefrom at predetermined intervals.

25. In a machine of the character described, mechanism for lowering a sheet of noodles, mechanism for cutting off said sheet in predetermined lengths, conveying means adapted to receive said noodles upon it as they descend, said cutting mechanism being suitably timed to cut said sheet into a length after the forward end of said length has reached the conveying means and mechanism for running said conveying means, operating to run said conveying means at a faster rate than the noodles descend.

26. In a machine of the character described, an upper conveying belt adapted to receive a plurality of noodles, a middle conveying belt, below said upper belt, for receiving the noodles fed from said upper belt, being given bodily motion during the time said noodles are received from said upper belt, a lower conveying belt adapted to receive the noodles as they are fed from said middle belt, said middle belt being given bodily motion as it feeds the noodles upon said lower belt, and mechanism adapted to operate all of said belts in their timed relation.

27. In a machine of the character described, an upper conveying belt adapted to receive a plurality of noodles, a middle conveying belt, below said upper belt, for receiving the noodles fed from said upper belt, being given bodily transverse motion during said reception, a lower conveying belt adapted to receive the noodles as they are fed from said middle belt, said middle belt being given bodily motion as it feeds the noodles upon said lower belt and mechanism adapted to operate all of said belts in their timed relation.

28. A machine as claimed in claim 26 in which the lower conveying belt is given an intermittent motion, remaining stationary during the time it receives the noodles from said middle belt.

29. In a machine of the character described, a conveying belt for feeding a plurality of noodles, a plurality of pivotally mounted arms upon which said belt is pivotally supported and mechanism for rocking said arms at predetermined intervals.

30. In a machine of the character described, an endless belt for feeding a plurality of noodles, a frame for supporting said belt and upon which it is adapted to have its feeding motion, a plurality of pivotally mounted arms upon which said frame is pivotally mounted and mechanism for effecting the feeding of the belt and the rocking of said arms in timed relation.

31. In a machine of the character described, an endless belt for feeding a plurality of noodles, a frame for supporting said belt and upon which it is adapted to have its feeding motion, a plurality of pivotally mounted arms upon which said frame is pivotally mounted at one region, a plurality of guides which another region of the frame is adapted to engage, whereby when said arms are rocked the frame is caused to reciprocate substantially horizontally.

32. In a machine of the character described, an endless belt for feeding a plurality of noodles, a frame for supporting said belt and upon which it is adapted to have its feeding motion, a plurality of pivotally mounted arms upon which said frame is pivotally mounted at one region for reciprocating said frame, rolling means attached to said frame at another region, other rolling means, substantially horizontal, acting as guides with which said former rolling means is adapted to engage, the axes of said former and latter means being substantially at right angles to each other.

33. In a machine of the character described, an endless belt for feeding a plurality of noodles, a frame for supporting said belt and upon which it is adapted to have its feeding motion, a plurality of pivotally mounted arms upon which said frame is mounted for reciprocating said frame longitudinally, said mounting also permitting said frame to be reciprocated transversely between said arms, and mechanism for effecting the longitudinal and transverse reciprocation of the frame in timed relation.

34. In a machine of the character described, an endless belt for feeding a plurality of noodles, a plurality of rollers over which said belt is adapted to run, a frame in which said rollers are rotatably mounted, a shaft upon which said frame is rotatably mounted, said shaft adapted to drive one of said rollers, and substantially horizontally reciprocating means in which said shaft is rotatably mounted.

35. In a machine of the character described, an endless belt for feeding a plurality of noodles, a frame in which said belt is adapted to run, a cross bar upon which said frame is mounted, and substantially longitudinally reciprocating means in which said cross bar is mounted, said frame also being adapted to be reciprocated transversely with respect to said longitudinally reciprocating means.

36. In a machine of the character described, an endless belt for feeding a plurality of noodles, a frame in which said belt is adapted to run, substantially longitudinally reciprocating means upon which said frame is mounted, said frame also being adapted to be reciprocated transversely with respect to said longitudinally reciprocating means, and means for running said belt, carried by the longitudinally reciprocating means.

37. In a machine of the character described, an endless belt for feeding a plurality of noodles, a plurality of rollers over which said belt is adapted to run, substantially longitudinally reciprocating means for giving said rollers a bodily longitudinal motion, one of said rollers being adapted to drive said belt, said driving roller being transversely slidably mounted in said reciprocating means.

38. In a machine of the character described, conveying means for feeding a plurality of noodles, a frame in which said means is adapted to run, said frame being suitably mounted to be reciprocated longitudinally and transversely, mechanism for effecting said longitudinal motion and a plurality of pivotally mounted arms adapted when rocked transversely to cause the transverse motion, said arms being also rocked longitudinally in accordance with said longitudinal motion.

39. In a machine of the character described, an endless belt for feeding a plurality of noodles off one end, said belt being adapted to be given bodily motion in addition to its feeding motion, and a roller cooperating with the feeding off end of the belt, said noodles passing off the belt between said roller and the belt, for preventing disarrangement of the noodles.

40. In a machine of the character described, an endless belt for feeding a plurality of noodles, a frame for supporting said belt and upon which it is adapted to have its feeding motion, rolling means attached to said frame, other rolling means substantially horizontal, acting as guides with which said former rolling means is adapted to engage, the axis of said former and latter means being substantially at right angles to each other, and means for adjusting the height of said frame with respect to said rolling means whereby the elevation of the belt may be varied.

41. In a machine for folding noodles, a receiving surface, means for delivering noodles to the receiving surface, a second receiving surface disposed below the first receiving surface, means for feeding the noodles from said first surface to said second surface mechanism adapted during said feeding to cause relative bodily motion between said surfaces whereby the noodles are deposited in folded form upon said second surface and means for adjusting the vertical distance between said surfaces.

42. In a machine for folding noodles, a receiving conveyor, means for delivering noodles to the conveyor, a second conveyor located below said first conveyor adapted to receive the noodles from said first conveyor, means for causing relative bodily motion between said conveyors while the noodles are being fed from said first conveyor and means for varying the vertical distance between said conveyors.

Signed at Brooklyn, New York, in the county of Kings and State of New York, this 27 day of Jan., A. D. 1926.

CARMINE SURICO.
PAUL CARDONE.